United States Patent [19]

Grafford et al.

[11] 3,797,093

[45] Mar. 19, 1974

[54] IMPROVED SEMI-AUTOMATIC COMPONENT SEQUENCING MACHINE

[75] Inventors: John G. Grafford, Dorr; Lloyd D. Herring, Jenison, both of Mich.

[73] Assignee: Rowe International Inc., Whippany, N.J.

[22] Filed: Oct. 30, 1972

[21] Appl. No.: 302,050

[52] U.S. Cl. .............................. 29/203 P, 29/208 F

[51] Int. Cl. ....................... H05k 13/04, B23p 19/04

[58] Field of Search ........... 29/203 P, 208 F, 203 D, 29/203 R

[56] References Cited

UNITED STATES PATENTS

| | | | |
|---|---|---|---|
| 3,391,473 | 7/1968 | Hays, Jr. | 29/208 F X |
| 3,657,790 | 4/1972 | Larrison | 29/208 F X |
| 3,710,482 | 1/1973 | Grafford | 29/203 B |

*Primary Examiner*—Thomas H. Eager

*Attorney, Agent, or Firm*—Shenier & O'Connor

[57] ABSTRACT

An improved semi-automatic component sequencing machine for facilitating the formation of a string of electrical components in a predetermined sequence with the leads of the components held between pairs of tapes, in which, in the course of an operator-initiated sequence, a pair of resilient centering fingers move in to engage the body of the leading one of a plurality of components supported by their leads between notched feed wheels and in which hammers drive the leads of the centered component away from the fingers and into engagement with the upper pressure sensitive tapes supported on spaced upper pressure wheels and into notches on spacer wheels associated with the upper pressure wheels and in which notched lower pressure wheels subsequently apply the lower tapes to the leads. The machine makes provision modifying its operation to change the inter-lead spacing.

19 Claims, 7 Drawing Figures

IMPROVED SEMI-AUTOMATIC COMPONENT SEQUENCING MACHINE

BACKGROUND OF THE INVENTION

There are known in the prior art automatic machines for inserting the leads of electrical components into printed circuit boards in accordance with a predetermined program. Machines of this type require a string of electrical components having a predetermined sequence and being arranged with a certain inter-lead spacing.

There are also known in the prior art completely automatic machines for making up strings of electrical components arranged in a predetermined sequence and with a predetermined spacing therebetween. These machines are capable of taking loose components in bulk and of forming such tapes in response to a program fed into the machine. Such fully automatic sequencing machines are complicated and are quite expensive. The capital investment required to purchase such a machine is not justified in plants in which equipment of this type will only sporadically be used. Such is the case in many plants where the printed circuitry required for the finished product is only a relatively small part of the overall manufacturing operation. Without such a machine, the manual assembly of such a string of components is an extremely time-consuming operation.

The copending application of John G. Grafford, Ser. No. 172,429 filed Aug. 17, 1971, now U.S. Pat. No. 3,710,482, discloses a Semi-Automatic Sequencing Machine which overcomes the problems set forth hereinabove. In operation of the machine, components fed thereto in a predetermined sequence by an operator will automatically be assembled with a predetermined spacing therebetween with the leads held between two pairs of pressure sensitive tapes.

One of the difficulites encountered in operation of the machine disclosed in the Grafford application referred to hereinabove was that of centering the components on the string. This difficulty was particularly evident with components differing in size. The centering operation of that machine is a function of the length of the leads of the component. Owing to the fact that the lead lengths of various components is not uniform either the centering operation is not properly accomplished or steps must be taken to ensure that the leads of all components are of the same length.

The copending application of Lloyd D. Herring, Ser. No. 237,014 filed Mar. 22, 1972, now U.S. Pat. No. 3,738,473, discloses a centering mechanism for a component sequencing machine which embodies an attempted solution to the problem of centering components. In the arrangement shown in that application, diverging jets of air are blown against the undersides of the components as they approach the tape-applying means. While the problem of centering components having leads of different lengths is to some degree solved by the pneumatic centering means, the solution to the problem did not provide as satisfactory as is desirable. First, the centering action is not as certain as is desirable. Secondly, the problem exists of blowing of the component leads out of the notches in the spacer mechanism which feeds the components to the tape applicator, with the result that the leads are not properly applied to the tapes.

In addition to the problem of centering the components, the machine disclosed in the Grafford application does not provide as accurate spacing of the components along the length of the string as is desired.

We have invented an improved semi-automatic component sequencer which overcomes the problem of semiautomatic component sequencing machines described hereinabove. Our improved machine accurately centers the components on the string without regard to differences in length of the component leads. Our machine provides a positive centering action which avoids the uncertainty of the pneumatic means disclosed in the Herring application. Our machine provides a more accurate linear spacing of components than has heretofore been achieved. Our machine is simpler and less expensive to construct than are semi-automatic sequencing machines heretofore known.

SUMMARY OF THE INVENTION

One object of our invention is to provide an improved semi-automatic component sequencing machine which overcomes the problems of semi-automatic component sequencers heretofore known.

Another object of our invention is to provide an improved semi-automatic component sequencing machine which accurately centers the components along the resultant string.

A further object of our invention is to provide an improved semi-automatic component sequencing machine which more accurately spaces components along the length of the string.

A still further object of our invention is to provide an improved semi-automatic component sequencing machine which is less expensive to construct and which is simpler than are semi-automatic component sequencing machines heretofore known.

Yet another object of our invention is to provide an improved semi-automatic component sequencing machine which is more certain in operation than are semi-automatic component sequencing machines heretofore known.

Other and further objects of our invention will appear from the following description.

In general our invention contemplates the provision of an improved machine for facilitating the formation of a string of components having a predetermined sequence in which the body of a component supported on its leads between spaced notched feed wheels is positively engaged by inwardly moving resilient centering fingers to center the component and in which the leads of the thus centered components are driven by hammers into engagement with the pressure sensitive surfaces of tapes on upper pressure rollers and into notches on component spacer wheels associated with the upper pressure wheels and in which notched lower pressure wheels subsequently apply lower tapes to the component leads. Means is provided for modifying the machine operation to change the intercomponent spacing.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENT

Figure 2:
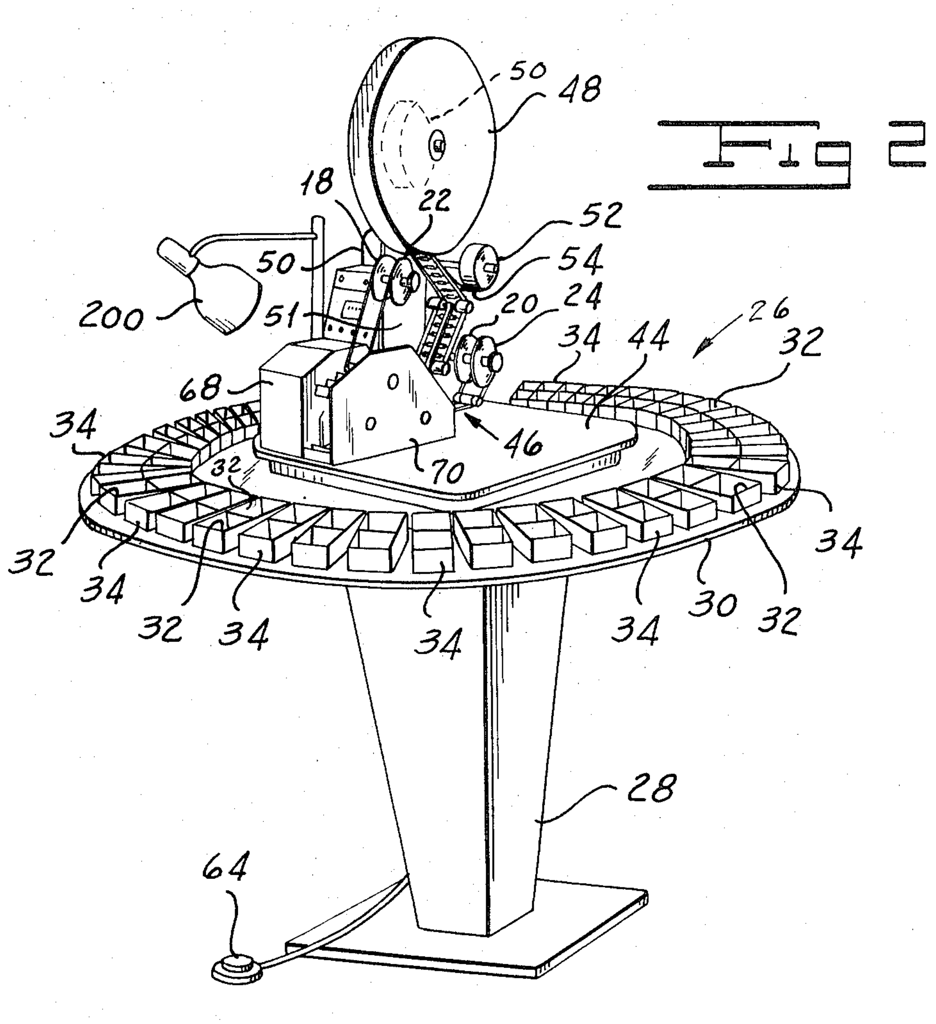
FIG. 2 is a perspective view of our semi-automatic component sequencing machine.
Figure 1:
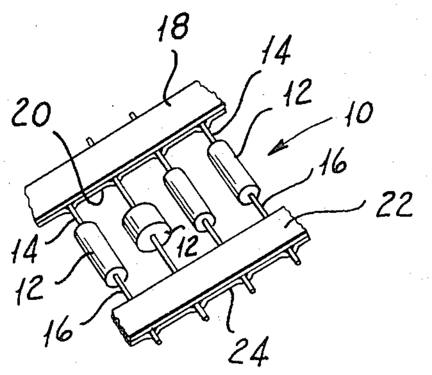
FIG. 1 is a fragmentary perspective view of a string of electrical components produced on our improved semi-automatic component sequencing machine.

Referring now to FIG. 1 of the drawings, a string indicated generally by the reference character 10, of components 12, each having a pair of leads 14 and 16 is held together by left hand upper and lower tapes 18 and 20 and by right hand upper and lower tapes 22 and 24.

Our improved machine includes a frame indicated generally by the reference 26 supported on a pedestal 28. Frame 26 supports an annular carrier 30 for rotary movement. Carrier 30 is adapted to support a plurality of circumferentially spaced boxes 34 each of which may form two bins 32 adapted to receive supplies of components. As will be explained more fully hereinbelow, in the course of operation of our machine the carrier 30 is stepped successively to present the boxes 34 to the operator stationed in front of the machine.

Figure 6:
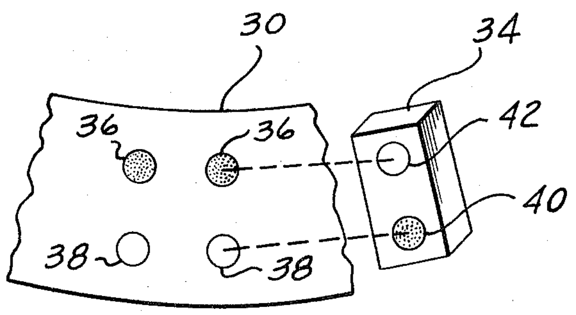
FIG. 6 is a fragmentary plan view of our improved semi-automatic component sequencing machine.

We provide our machine with means for ensuring that the boxes 34 can be placed on the carrier 30 with only one radial orientation so that the components are presented to the operator in the correct sequence. To accomplish this result we employ a material made and sold by American Velcro Inc. of Manchester, N. H., under the registered trade mark "Velcro." This material includes a first piece 36 comprising a plurality of hook-like elements adapted to be interlocked with loops on the other piece 38 in response to pressure. Once the two pieces of material have thus been connected they can be stripped apart manually. As shown in FIG. 6, we apply radially spaced pieces 36 and 38 of material to the carrier 30. The piece 36 may, for example, be hook material while the piece 38 is loop material. We apply corresponding spaced pieces of material 40 and 42 to the box 34. One of the pieces 40 is hook material while the other piece is loop material. It will readily be appreciated that a box 34 can be assembled on the carrier 30 with only one radial orientation. That is, the hook piece 40 must register with the loop piece 38 and the loop piece 42 must register with the hook piece 36.

Our machine includes a take-up reel 48 adapted to be driven by a constant torque motor 50 to receive the string 10 of components. We provide a roll 52 of paper adapted to be wound onto the reel 48 together with the string of components.

Figure 5:
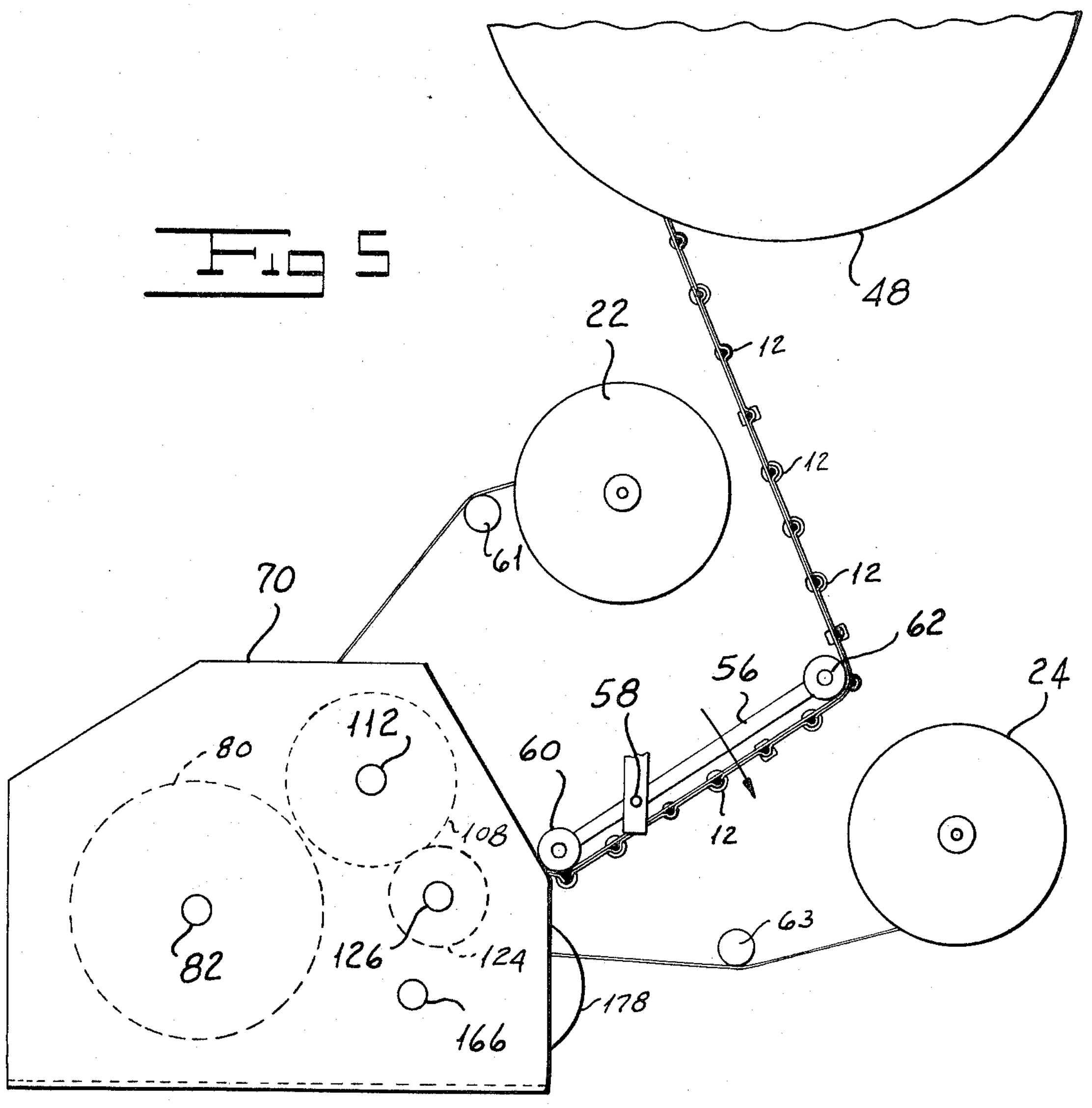
FIG. 5 is a side elevation of our improved semi-automatic component sequencing machine.

Referring now to FIG. 5, we provide our machine with means for ensuring a relatively constant tension on the string 10. A gravity loaded lever 56 is supported in an off-center position on a pivot pin 58 carried by the machine frame. The ends of the lever 56 carry respective rollers 60 and 62 adapted to engage the string 10 being fed to the take-up reel 48. Tapes 18 and 20 are fed from respective rolls over guide rollers 61 to the assembly unit 46. Similarly, the lower tapes 20 and 24 are fed around guide rolls 63 to the unit 46.

Figure 3:
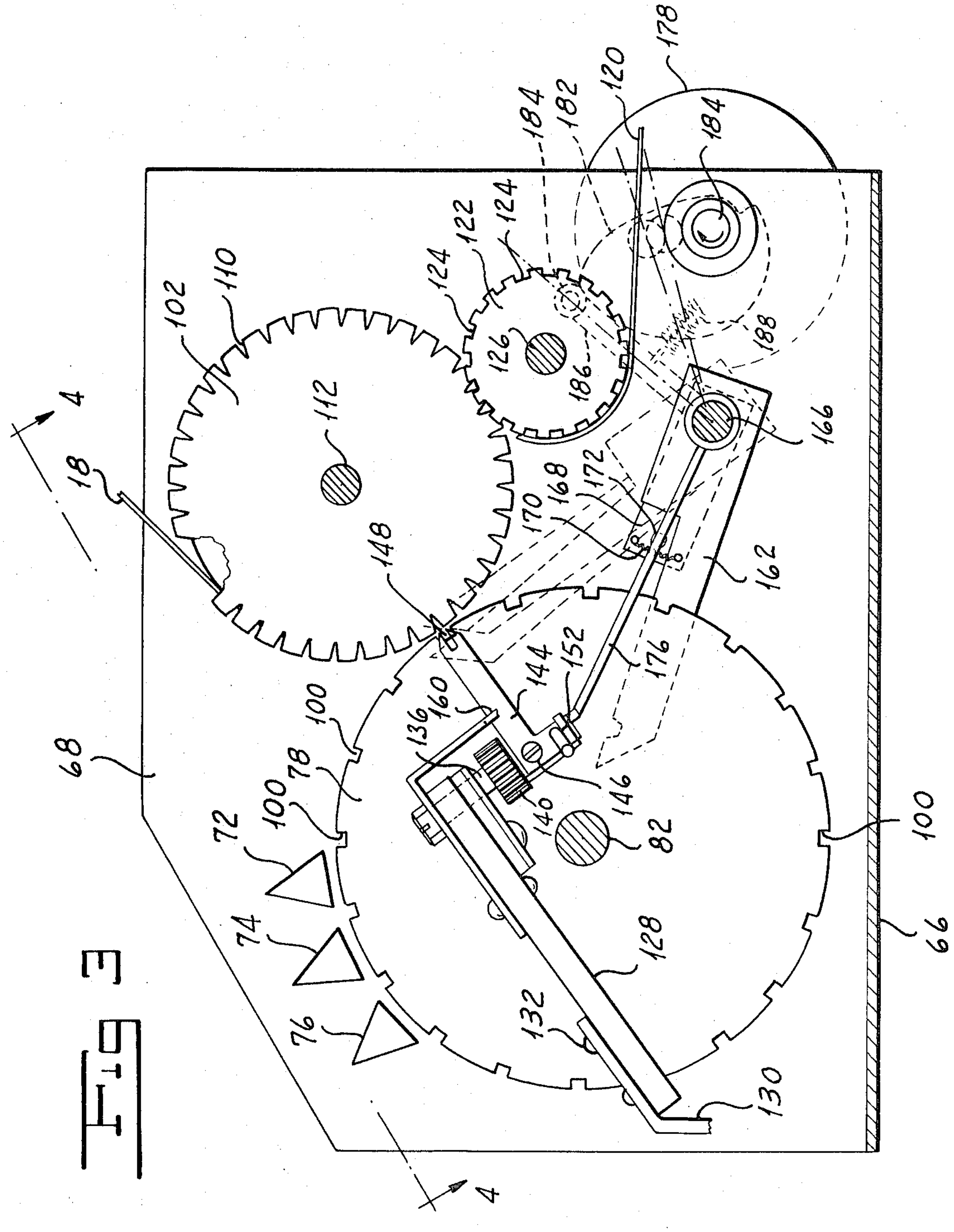
FIG. 3 is a fragmentary sectional view of our improved semi-automatic component sequencing machine showing the apparatus for applying the component leads to the tapes.
Figure 4:
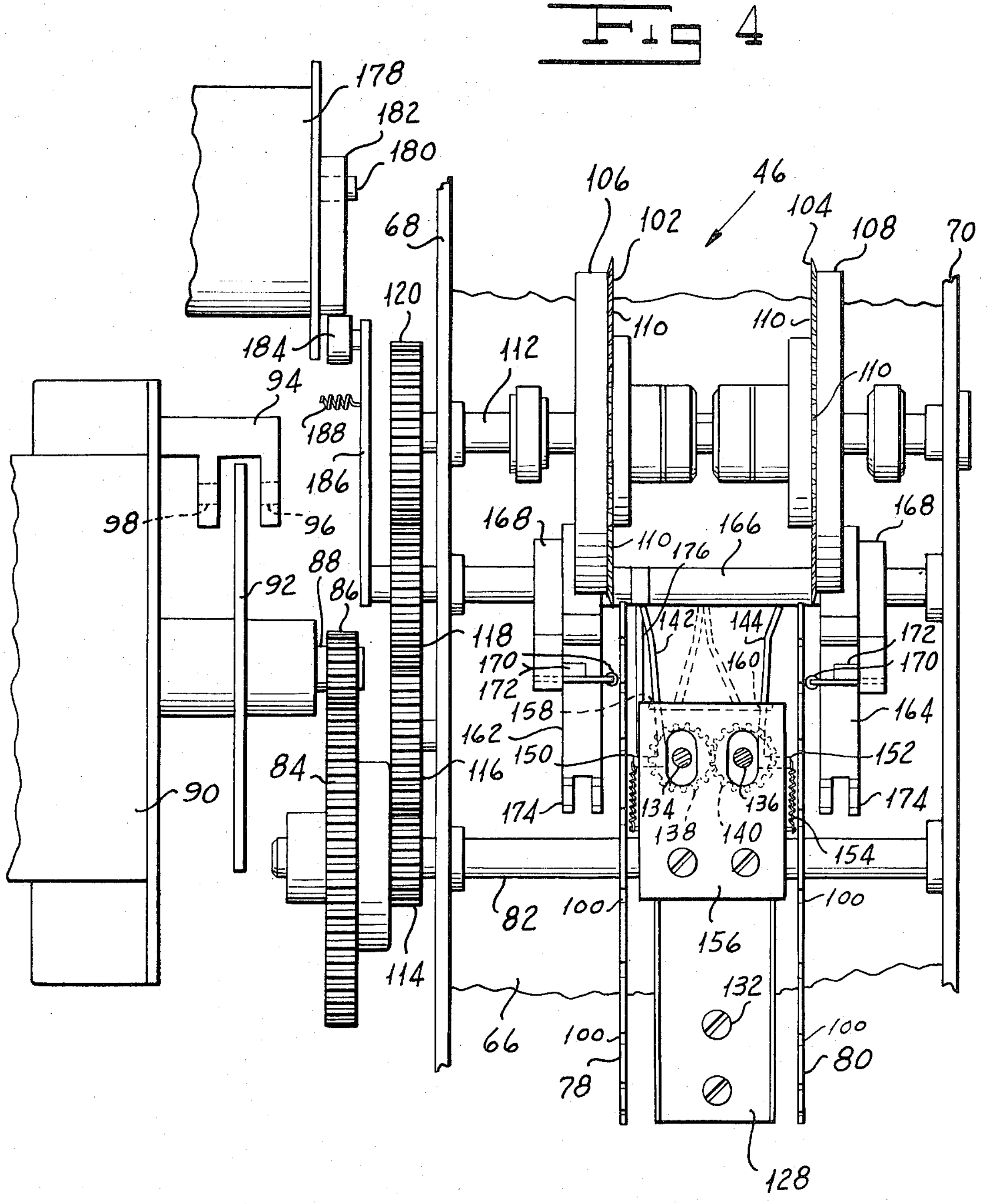
FIG. 4 is a plan view of the portion of our semi-automatic component sequencing machine shown in FIG. 3 and taken along the line 4—4 thereof.

Referring now to FIGS. 3 and 4, the unit 46 includes a pair of side plates 68 and 70 carried by the unit base 66. Each of the side plates 68 and 70 carries a set of three component-lead guides 72, 74 and 76, each of which has a generally triangular cross section. The spaces between adjacent guides 72 and 74 and 76 and 78 form funnel-like openings for receiving the leads of components being fed into the machine by the operator. Leads thus fed into the machine are received in the notches 100 of a pair of linear spacing wheels 78 and 80 carried by a shaft 82 for rotation therewith. Shaft 82 also carries a gear 84 adapted to be driven by a pinion 86 carried by the shaft 88 of a motor 90. Shaft 88 also carries a control wheel 92 provided with a plurality of spaced openings or the like. As will be explained more fully hereinbelow, after motor 90 has been energized, and following one quarter of a revolution of the shaft 88, control wheel 92 permits light from a lamp 96 carried in a sensor bracket 94 to impinge on a photo responsive device 98 on the bracket 94 to interrupt the motor circuit. Further as will be more fully explained hereinbelow, the ratio of the diameter of pinion 86 to that of gear 84 is such that one quarter of a revolution of the motor shaft 88 produces one twentieth of a revolution of shaft 82 and of the spacer wheels 78 and 80. Each of these wheels has twenty notches 100 so that upon each quarter revolution of the motor shaft, the feed wheels are advanced one notch.

The leads of the leading component supported on the wheels 78 and 80 are adapted to be advanced into the notches 110 of a pair of star wheels 102 and 104 associated with pressure wheels 106 and 108 carrying the upper tapes 18 and 22. All the wheels 102, 104, 106 and 108 are carried by a shaft 112 for rotation therewith. Shaft 82 carries a pinion 114 adapted to drive a gear 120 on shaft 112 through the medium of a pair of idler gears 116 and 118. The arrangement of the gearing is such that one revolution of the shaft 82 produces a half revolution of shaft 112. Thus, when the wheels 78 are driven through one twentieth of a revolution, the wheels 102 and 104 are driven through one fortieth of a revolution. We provide the wheels 102 and 104 with 40 notches 110 each so that when wheels 78 and 80 are driven through a distance corresponding to the internotch spacing thereof, wheels 102 and 104 likewise are driven through a spacing corresponding to one internotch space. We so construct the wheels 102 and 104 that the space between a pair of adjacent notches thereon corresponds to a certain inter-component spacing.

It is to be noted that, for purposes of clarity in exposition, I have not shown the components and have shown the tapes only fragmentarily in FIG. 3. In addition, in FIG. 4 I have omitted both the tapes and the components.

The lower tapes 20 and 24 extend around respective lower pressure wheels 122 and 124 associated with the respective upper pressure wheels 106 and 108. The lower pressure wheels 122 apply the lower tapes 20 and 24 to the leads of components which have been adhesively secured to the upper tapes 18 and 22 in a manner to be described. We provide the wheels 122 with a plurality of circumferentially spaced peripheral notches 124 each of which is of a size sufficient to accommodate the lead and the portion of a lower tape wound therearound.

We secure a mounting block 128 to a bracket 130 carried by the machine frame 26 by any suitable means such as by screws 132. The mounting block 128 carries a pair of shafts 134 and 136 which support respective pinions 138 and 140 for rotation therewith. We secure respective component centering arms 142 and 144 to the shafts 134 and 136 for rotation therewith by any suitable means such, for example, as by screws 146. We provide the end of each of the centering arms 142 and 144 with a notch 148 adapted to receive the lead of a component in a manner to be described. Each of the shafts 134 and 136 also carries a crank arm 150 and 152. A spring 154 attached to crank arm 152 normally urges the centering arms 142 and 144 to the full line position illustrated in FIG. 4 at which position they engage respective limit stops 158 and 160 on a bracket 156 carried by the block 128. In a manner to be described more fully hereinbelow, in operation of the machine the arms 142 and 144 are adapted to move toward each other to receive the leads of a component supported in notches 100 of wheels 78 and 80 in their notches 148 and then to engage the body of the component to center the same.

We provide our machine with a pair of spaced hammers 162 and 164 rotatably carried by a shaft 166 supported in sides 68 and 70. Respective stop blocks 168 associated with hammers 162 and 164 are carried by shaft 166 for rotation therewith. Springs 170 urge the respective hammers 162 and 164 into engagement with stop pins 172 on the blocks 168. We bifurcate the upper ends 174 of the hammers 162 and 164 for a reason which will be explained more fully hereinbelow. We mount a finger drive rod 176 on the shaft 166 for movement therewith to engage the crank arm 150 on shaft 134 to move the centering arms 142 and 144 against the action of spring 154 in a manner to be described.

We provide our machine with mechanism for driving shaft 166 in such a way that rod 176 first moves the centering arms 142 and 144 inwardly to center a component supported on wheels 78 and 80 and then to drive the shaft 166 rapidly to cause the hammers 162 and 164 to engage the leads of the centered component and to drive them into engagement with the adhesive sides of the upper tapes supported on upper pressure wheels 106 and 108 and concomitantly to move the leads into notches 110 on the wheels 102 and 104. A control motor 178 has a shaft 180 carrying a cam 182 for rotation therewith. A follower 184 adapted to engage a cam 182 is carried by a follower arm 186 secured to shaft 166 for rotation therewith. A spring 188 acting on arm 186 normally urges shaft 166 to rotate in a clockwise direction as viewed in FIG. 3 to move follower 184 into engagement with the surface of cam 182. When motor 178 is energized to drive its shaft 180 in a clockwise direction as viewed in FIG. 3 the motion of shaft 166 is so controlled that it moves relatively slowly for about its first 30° of movement and then rapidly through the next 6° of movement, after which it is returned to its initial position.

Figure 7:
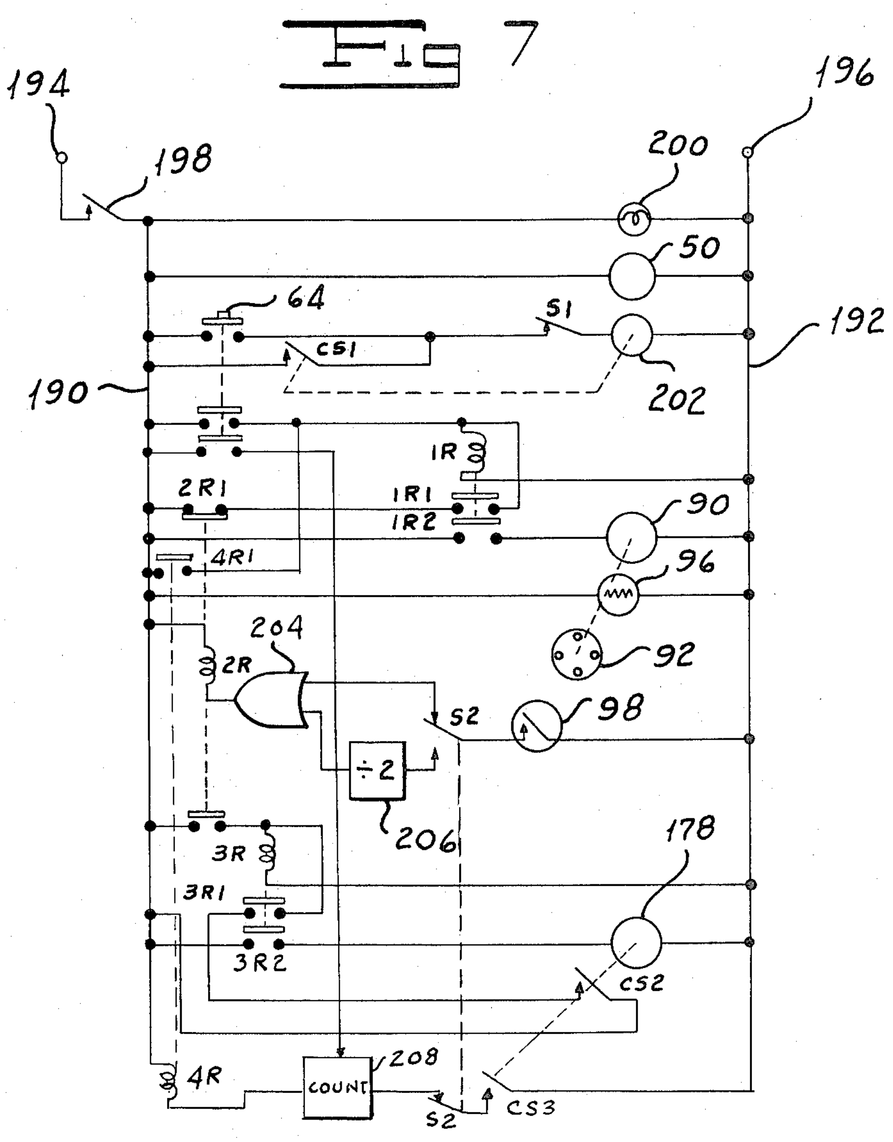
FIG. 7 is a schematic view illustrating one form of electrical circuit which may be used to control the operation of our semi-automatic component sequencing machine.

Referring now to FIG. 7, one form of control circuit which may be used to control the operation of our machine includes respective conductors 190 and 192, the conductor 190 of which is connected to one terminal 194 of a suitable source of potential through an on-off switch 198 and the other conductor 192 of which is connected to the other terminal 196 of the source. When switch 198 is closed a lamp 200 is lit and the take-up motor 50 is energized. To initiate an operation of the machine, the foot switch 64 is operated momentarily to energize the table motor 202 through a switch S1 which may be opened in the event it is not desired to step the table. As is more fully explained in the copending application referred to hereinabove, motor 202 completes its own holding circuit through a switch CS1 for a predetermined rotation of the table. At the end of that movement switch CS1 opens and motor 202 is deenergized.

Closing the switch 64 also momentarily energizes a relay winding 1R to close respective normally open switches 1R1 and 1R2. Switch 1R1 completes the holding circuit for relay winding 1R through a normally closed switch 2R1. Switch 1R2 completes the circuit for motor 90. As is explained hereinabove, motor 90 drives the control wheel 92 in the path of light from a source 96 to a light sensitive element 98. When light from the source 96 impinges on the element 98 it completes a circuit through a switch S2 to one input terminal of a two-input OR circuit 204. When that occurs a winding 2R is energized to open the normally closed switch 2R1 in the holding circuit of relay winding 1R to interrupt the circuit and to deenergize motor 90. Switch S2 is adapted to be moved to a second position at which it applies the output of the device 98 to a divide by two network 206 providing the other input to OR circuit 204. In this manner, the motor 90 may drive through a distance corresponding to two inter-notch spacings if desired in a manner to be described hereinbelow.

Closing of switch 2R2 energizes a relay winding 3R to close its own holding circuit through a normally open switch 3R1 and to close a switch 3R2 to complete the circuit of the control motor 178. That motor may be provided with a one revolution switch CS2 of any suitable type known to the art to ensure that motor drives through one revolution after being energized.

We so arrange our system that for the first intercomponent spacing on each cycle initiated by operation of switch 64 the wheels 78 and 80 step through two successive steps each of which is equal to the space between a pair of adjacent notches 100. Moreover, with this setup the fingers 142 and 144 and the hammers 162 and 164 operate twice in the course of the cycle. In addition to the operations described above, operation of switch 64 sets a counter 208 to count down one count. A switch CS3 which is momentarily closed by any suitable means as motor 178 completes a revolution provides an input to counter 208. With switch S2 in the position shown and at the end of the first operation of the hammers 162 and 164 a relay 4R is energized momentarily through counter 208 and switches S2 and CS3. Energization of winding 4R closes a switch 4R1 to initiate the second step of wheels 78 and 80 and the second operation of the centering fingers and hammers. It will readily be appreciated that the closing of switch CS3 at the end of the second hammer operation will not energize 4R since counter 208 is reset.

If desired the operator may double the intercomponent spacing by changing the position of switch S2. When this is done, network 206 delays the energization of winding 2R until the second operation of switch 98 so that on each cycle initiated by switch 64 wheels 78 and 80 rotate through a single step equal to twice the distance between adjacent slots 100 and the centering fingers and hammers operate only once on each cycle.

In use of our machine to assemble a string of components having a first inter-component spacing, switch S2 is set in the position illustrated in FIG. 7. Boxes 34 are placed at the locations around the table 30 in the proper order with the Velcro pieces 40 and 42 ensuring that the bins of the boxes are in proper radial order to permit the operator to remove components in the proper sequence.

As is known in the art, the distance between lead ends of components falls within the range of between 2 inches and 3½ inches. For leads of normal length hammers 162 and 164 are set on shaft 166 with a spacing of about 2 1/16 inches between their longitudinal center lines. If, however, components having relatively short leads are to be assembled into a string hammers 162 and 164 are moved together so that the distance between their longitudinal center lines is about 1⅝ inches. In this latter position of the hammers, the bifurcated ends 174 of the hammers accommodate the edges of wheels 102 and 104 in operation of the apparatus.

Where the components are to be assembled on the tapes with a first relatively closer inter-lead spacing, switch S2 is moved to the position shown in FIG. 7. With the apparatus thus set up, the operator feeds two components to the machine through the spaces formed by adjacent pairs of the guides 72, 74 and 76. The component leads are received in the slots 100 in the wheels 78 and 80. Next, the operator actuates switch 54. This operation sets counter 208 to pass one pulse. At the same time, the table motor 202 is energized for a predetermined time to step the table 30 through a distance equal to the distance between successive boxes 34. Operation of switch 64 further energizes relay 1R to energize feed motor 90 to rotate shaft 82. The shaft rotates through a distance equal to the distance between adjacent slots 100 at which time switch 98 closes to apply a pulse to circuit 204 to energize winding 2R to interrupt the holding circuit of winding 1R and stop the motor. At the same time, winding 3R is energized to energize motor 178 for a single revolution thereof. In the course of the revolution of motor 178, cam 182 drives shaft 166 so that it moves relatively slowly in a clockwise direction as viewed in FIG. 3. In the course of this movement rod 176 drives fingers 142 and 144 into engagement with the component body to center the component. Following this action, shaft 166 moves relatively rapidly to cause hammers 162 and 164 to drive the component leads into engagement with the pressure sensitive sides of the upper tapes 18 and 22.

As the motor 178 completes a revolution, switch CS3 closes to cause counter 208 to energize winding 4R to close switch 4R1 to produce another step of shaft 82 and another operation of the centering fingers and hammers. At this time the counter is reset so that no further operations take place until switch 64 is again actuated.

As the components are carried around on the upper tapes 18 and 22 by the wheels 102 and 104, the lower tapes 20 and 24 are applied thereto by wheels 122 and 124. The assembled string of components is taken up by reel 48. Lever 56 and its rollers 60 and 62 maintain the string tension substantially constant.

If in the course of assembling a string of components it is required that the inter-lead spacing be changed for one component, the operator may, without changing the cycle, merely load one component into the machine for the cycle. If a number of components requiring a greater inter-lead spacing are being assembled, switch S2 is moved from the position shown in FIG. 7 to its other position. In this setup, network 206 causes the shaft 82 to be driven through twice the space between adjacent slots 100 on each cycle and the centering fingers and hammers operate only once during the cycle. It will readily be appreciated that with this setup the operator feeds only one component to the machine on each cycle.

It will be seen that we have accomplished the objects of our invention. We have provided an improved semiautomatic component sequencing machine which overcomes the problems of sequencing machines heretofore known. Our machine accurately centers components along the string. It more accurately spaces the components along the length of the string. It is simpler and less expensive to construct than sequencing machines heretofore known. It is more certain in operation than are machines of the type known in the art for producing sequenced strings of components.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for forming a string of components having bodies and leads in a predetermined sequence and with a certain spacing therebetween with the leads of each component held by respective lengths of material including in combination, means for receiving the leads of components with said spacing therebetween and for advancing said components to a centering station, means at said centering station for centering the body of a component on said receiving means, means adjacent to said centering station for supporting a length of adhesive material and means for driving the lead of a centered component into engagement with said length.

2. Apparatus as in claim 1 including means adjacent to said centering station for supporting a second length of adhesive material and in which said driving means comprises means for driving the leads of a centered component respectively into engagement with said lengths.

3. Apparatus as in claim 1 including means adjacent to said centering station for supporting a second length of adhesive material and in which said driving means comprises means for driving the leads of a centered component respectively into engagement with said lengths and in which said centering means comprises respective fingers, means mounting said fingers for movement from first positions out of engagement with the ends of a component body at said centering station to second positions in engagement with the ends of a component body at said centering station and means for moving said fingers from said first positions to said second positions.

4. Apparatus as in claim 1 including means adjacent to said centering station for supporting a second length of adhesive material and in which said driving means comprises means for driving the leads of a centered component respectively into engagement with said lengths and in which said centering means comprises respective fingers, means mounting said fingers for movement from first positions out of engagement with the ends of a component body at said centering station to second positions in engagement with the ends of a component body at said centering station and means for moving said fingers from said first positions to said second positions and in which said driving means comprises respective hammers, means mounting said hammers for movement from first positions out of engagement with the leads of components at said centering station to positions in engagement with components at said centering station and means for rapidly moving said hammers from said first positions to said second positions to drive the leads of a component at said centering station into engagement with said lengths.

5. Apparatus as in claim 1 including means adjacent to said centering station for supporting a second length of adhesive material and in which said driving means comprises means for driving the leads of a centered component respectively into engagement with said lengths and in which said centering means comprises respective fingers, means mounting said fingers for movement from first positions out of engagement with the ends of a component body at said centering station to second positions in engagement with the ends of a component body at said centering station and means for moving said fingers from said first positions to said second positions and in which said driving means comprises respective hammers, means mounting said hammers for movement from first positions out of engagement with the leads of components at said centering station to positions in engagement with components at said centering station and means for rapidly moving said hammers from said first positions to said second positions to drive the leads of a component at said centering station into engagement with said lengths, said apparatus including means for operating said finger and hammer moving means in timed sequence.

6. Apparatus as in claim 1 including means adjacent to said centering station for supporting a second length of adhesive material and in which said driving means comprises means for driving the leads of a centered component respectively into engagement with said lengths and in which said centering means comprises respective fingers, means mounting said fingers for movement from first positions out of engagement with the ends of a component body at said centering station to second positions in engagement with the ends of a component body at said centering station and means for moving said fingers from said first positions to said second positions and in which said driving means comprises respective hammers, means mounting said hammers for movement from first positions out of engagement with the leads of components at said centering station to positions in engagement with components at said centering station and means for rapidly moving said hammers from said first positions to said second positions to drive the leads of a component at said centering station into engagement with said lengths, said apparatus including means for operating said finger and hammer moving means in timed sequence and in which said receiving means comprises spaced wheels having notches therein for receiving component leads, means mounting said feed wheels for movement from a loading station to said centering station, means for stepping said wheels and means responsive to said stepping means for activating said operating means.

7. Apparatus as in claim 1 including means adjacent to said centering station for supporting a second length of adhesive material and in which said driving means comprises means for driving the leads of a centered component respectively into engagement with said lengths and in which said centering means comprises respective fingers, means mounting said fingers for movement from first positions out of engagement with the ends of a component body at said centering station to second positions in engagement with the ends of a component body at said centering station and means for moving said fingers from said first positions to said second positions and in which said driving means comprises respective hammers, means mounting said hammers for movement from first positions out of engagement with the leads of components at said centering station to positions in engagement with components at said centering station and means for rapidly moving said hammers from said first positions to said second positions to drive the leads of a component at said centering station into engagement with said lengths, said apparatus including means for operating said finger and hammer moving means in timed sequence and in which said receiving means comprises spaced wheels having notches therein for receiving component leads, means mounting said feed wheels for movement from a loading station to said centering station, means for stepping said wheels and means responsive to said stepping means for activating said operating means and in which said operating means comprises a shaft and in which said finger moving means is responsive to a first rotary displacement of said shaft and in which said hammer moving means moves said hammers to drive said centered component leads away from said fingers and into engagement with said lengths in the course of a second rotary displacement of said shaft and means for driving said shaft relatively slowly during said first rotary displacement and relatively rapidly during said second rotary displacement.

8. Apparatus as in claim 1 including means adjacent to said centering station for supporting a second length of adhesive material and in which said driving means comprises means for driving the leads of a centered component respectively into engagement with said lengths and in which said centering means comprises respective fingers, means mounting said fingers for movement from first positions out of engagement with the ends of a component body at said centering station to second positions in engagement with the ends of a component body at said centering station and means for moving said fingers from said first positions to said second positions and in which said driving means comprises respective hammers, means mounting said hammers for moving from first positions out of engagement with the leads of components at said centering station to positions in engagement with components at said centering station and means for rapidly moving said hammers from said first positions to said second positions to drive the leads of a component at said centering station into engagement with said lengths, said apparatus including means for operating said finger and hammer moving means in timed sequence and in which said receiving means comprises spaced wheels having notches therein for receiving component leads, means mounting said feed wheels for movement from a loading station to said centering station, means for stepping said wheels and means responsive to said stepping means for activating said operating means and in which said operating means comprises a shaft and in which said fingers moving means is responsive to a first rotary displacement of said shaft and in which said hammer moving means moves said hammers to drive said centered component leads away from said fingers and into engagement with said lengths in the course of a second rotary displacement of said shaft and means for driving said shaft relatively slowly during said first rotary displacement and relatively rapidly during said second rotary displacement and in which said fingers are resilient.

9. Apparatus as in claim 1 including means adjacent to said centering station for supporting a second length of adhesive material and in which said driving means comprises means for driving the leads of a centered component respectively into engagement with said lengths and in which said centering means comprises respective fingers, means mounting said fingers for movement from first positions out of engagement with the ends of component body at said centering station to second positions in engagement with the ends of a component body at said centering station and means for moving said fingers from said first positions to said second positions and in which said driving means comprises respective hammers, means mounting said hammers for movement from first positions out of engagement with the leads of components at said centering station to positions in engagement with components at said centering station and means for rapidly moving said hammers from said first positions to said second positions to drive the leads of a component at said centering station into engagement with said lengths, said apparatus including means for operating said finger and hammer moving means in timed sequence and in which said receiving means comprises spaced wheels having notches therein for receiving component leads, means mounting said feed wheels for movement from a loading station to said centering station, means for stepping said wheels and means responsive to said stepping means for activating said operating means and in which said operating means comprises a shaft and in which said finger moving means is responsive to a first rotary displacement of said shaft and in which said hammer moving means moves said hammers to drive said centered component leads away from said fingers and into engagement with said lengths in the course of a second rotary displacement of said shaft and means for driving said shaft relatively slowly during said first rotary displacement and relatively rapidly during said second rotary displacement and in which said fingers are resilient, said apparatus including respective lost motion connections mounting said hammers on said shaft.

10. Apparatus as in claim 1 including means adjacent to said centering station for supporting a second length of adhesive material and in which said driving means comprises means for driving the leads of a centered component respectively into engagement with said lengths and in which said centering means comprises respective fingers, means mounting said fingers for movement from first positions out of engagement with the ends of a component body at said centering station to second positions in engagement with the ends of a component body at said centering station and means for moving said fingers from said first positions to said second positions and in which said driving means comprises respective hammers, means mounting said hammers for movement from first positions out of engagement with the leads of components at said centering station to positions in engagement with components at said centering station and means for rapidly moving said hammers from said first positions to said second positions to drive the leads of a component at said centering station into engagement with said lengths, said apparatus including means for operating said finger and hammer moving means in timed sequence and in which said receiving means comprises spaced wheels having notches therein for receiving component leads, means mounting said feed wheels for movement from a loading station to said centering station, means for stepping said wheels and means responsive to said stepping means for activating said operating means and in which said operating means comprises a shaft and in which said finger moving means is responsive to a first rotary displacement of said shaft and in which said hammer moving means moves said hammers to drive said centered component leads away from said fingers and into engagement with said lengths in the course of a second rotary displacement of said shaft and means for driving said shaft relatively slowly during said first rotary displacement and relatively rapidly during said second rotary displacement and in which said fingers are resilient, said apparatus including respective lost motion connections mounting said hammers on said shaft and in which said finger mounting means comprises respective pinion shafts, means mounting said fingers on said shafts, respective interengaging pinions on said shafts and means responsive to movement of said operating means shaft for driving said pinion shafts.

11. Apparatus as in claim 1 including means adjacent to said centering station for supporting a second length of adhesive material and in which said driving means comprises means for driving the leads of a centered component respectively into engagement with said lengths said lengths being upper lengths, said apparatus including means for applying lower lengths to the leads of components on said upper lengths to form said string, a take up reel for receiving said string, means for driving said take up reel and means including a gravity biased lever for regulating the tension in the length of said string extending to said take-up reel.

12. Apparatus as in claim 1 in which said receiving means comprises spaced wheels having spaced peripheral notches for receiving said leads, said notches having a predetermined inter-notch spacing, means mounting said wheels for movement of said notches from an input station to said centering station, means for initiating a cycle of operation of said apparatus and means responsive to said initiating means for selectively moving said wheels through two steps each equal to one inter-notch space and moving said wheels through one step equal to two inter-notch spaces in the course of said cycle.

13. Apparatus as in claim 1 including means mounting said receiving means for movement from an input station to said centering station, a plurality of boxes each having a pair of bins therein for storing components, a table mounted for movement past said input station and means for releasably mounting said boxes on said take with only one orientation of said bins.

14. In a semi-automatic sequencing machine for forming a string of components having bodies and leads centering apparatus including means for supporting a component by its leads at a centering station, a pair of resilient fingers at said centering station, means mounting said fingers for movement between first positions remote from the centerline of said string to second positions adjacent to the centerline of said string to engage the body of a component at said centering station to center said body with reference to the centerline of said string, and means for moving said fingers from said first positions to said second positions.

15. Apparatus as in claim 14 including means for biasing said fingers to said first positions and means responsive to operation of said machine for actuating said moving means to move said arms against the action of said biasing means.

16. Apparatus as in claim 15 in which said fingers have bifurcated ends for accommodating the leads of said component.

17. In a semiautomatic sequencing machine for forming a string of components having bodies and leads apparatus for applying said leads to adhesive tapes including means for supporting a component at a station, means adjacent to said station for supporting a pair of spaced adhesive tapes, a pair of hammers, means mounting said hammers in spaced relationship for movement from first positions remote from said tapes through second positions at which they engage the leads of a supported component to third positions at which they apply said leads to said tapes, and means responsive to operation of said machine for driving said hammers.

18. In a semiautomatic sequencing machine for forming a string of components having bodies and leads, apparatus for centering said components and for applying the component leads to adhesive tapes including means for supporting a component by its leads at a centering station, a pair of resilient fingers at said centering station, means mounting said fingers for movement between positions remote from the centerline of said string to second positions adjacent to the centerline of said string to engage the body of a component at said centering station to center said body with reference to the centerline of said string, means adjacent to said station for supporting a pair of spaced adhesives tapes, a pair of hammers, means mounting said hammers in spaced relationship for movement from first positions remote from said tapes through second positions at which they engage the leads of a centered component to third positions at which they apply said leads to said tapes, and means responsive to operation of said machine for moving said fingers and said hammers sequentially to cause said fingers to center a component and to cause said hammers to apply the leads of a centered component to said tapes.

19. Apparatus as in claim 18 in which said moving means comprises means for moving said fingers relatively slowly from said first to said second positions and for moving said hammers relatively rapidly from said second to said third positions.

* * * * *